(12) United States Patent
Schmitz et al.

(10) Patent No.: US 9,810,150 B2
(45) Date of Patent: Nov. 7, 2017

(54) HEAT EXCHANGER ASSEMBLY

(71) Applicant: UNITED TECHNOLOGIES CORPORATION, Farmington, CT (US)

(72) Inventors: John T. Schmitz, West Hartford, CT (US); Joe Ott, Enfield, CT (US); Lexia Kironn, Rocky Hill, CT (US); Evan Butcher, Manchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 151 days.

(21) Appl. No.: 14/826,380

(22) Filed: Aug. 14, 2015

(65) Prior Publication Data

US 2016/0108815 A1 Apr. 21, 2016

Related U.S. Application Data

(60) Provisional application No. 62/066,563, filed on Oct. 21, 2014.

(51) Int. Cl.
*F01P 3/00* (2006.01)
*F02C 7/14* (2006.01)
(Continued)

(52) U.S. Cl.
CPC ............... *F02C 7/14* (2013.01); *B23P 15/26* (2013.01); *F28D 1/0476* (2013.01);
(Continued)

(58) Field of Classification Search
CPC .... B23P 15/26; F28D 1/0476; F28D 1/05366; F28F 9/0268; F28F 1/126; F05D 2220/20; F05D 2230/31
(Continued)

(56) References Cited

U.S. PATENT DOCUMENTS 3,896,875 A 7/1975 Bolger
4,474,001 A * 10/1984 Griffin ..................... F02C 7/16
60/204
(Continued)

FOREIGN PATENT DOCUMENTS

EP 2871433 A1 5/2015
JP 56173878 5/1981
(Continued)

OTHER PUBLICATIONS

European Search Report for Application No. 15190595.7; dated Mar. 18, 2016; 8 pgs.
(Continued)

*Primary Examiner* — Davis Hwu
(74) *Attorney, Agent, or Firm* — Cantor Colburn LLP

(57) ABSTRACT

A heat exchanger assembly for a gas turbine engine including a frame, including a non-planar outer wall, a non-planar inner wall spaced radially inward from the non-planar outer wall to form a frame cavity therebetween, an inlet side extending between the non-planar outer wall and the non-planar inner wall, an inlet passage extending through the inlet side, an outlet side extending between the non-planar outer wall and the non-planar inner wall opposite the inlet side; an outlet passage extending through the outlet side, and a continuous non-planar core disposed within the frame cavity and in flow communication with the inlet passage and the outlet passage.

15 Claims, 3 Drawing Sheets

(51) Int. Cl.
*B23P 15/26* (2006.01)
*F28F 9/02* (2006.01)
*F28D 1/047* (2006.01)
*F28D 1/053* (2006.01)
*F28F 1/12* (2006.01)
*F28D 21/00* (2006.01)

(52) U.S. Cl.
CPC ........ *F28F 9/0268* (2013.01); *F05D 2220/20* (2013.01); *F05D 2230/31* (2013.01); *F05D 2250/20* (2013.01); *F05D 2250/71* (2013.01); *F05D 2260/213* (2013.01); *F05D 2260/22141* (2013.01); *F05D 2260/98* (2013.01); *F28D 1/05366* (2013.01); *F28D 2021/0021* (2013.01); *F28F 1/126* (2013.01); *F28F 2255/00* (2013.01); *Y02T 50/676* (2013.01)

(58) Field of Classification Search
USPC .......................................................... 165/51
See application file for complete search history.

(56) References Cited

U.S. PATENT DOCUMENTS

| | | | | |
|---|---|---|---|---|
| 4,964,459 | A * | 10/1990 | Stenlund | F28D 7/106 123/41.33 |
| 6,106,229 | A | 8/2000 | Nikkanen | |
| 6,494,031 | B2 | 12/2002 | Takehara | |
| 8,069,905 | B2 * | 12/2011 | Goto | F28D 7/1615 165/145 |
| 8,387,362 | B2 | 3/2013 | Storage et al. | |
| 2002/0074105 | A1 * | 6/2002 | Hayashi | B60H 1/025 165/43 |
| 2004/0177949 | A1 * | 9/2004 | Shimoya | F28F 1/022 165/152 |
| 2008/0053060 | A1 | 3/2008 | Olver | |
| 2008/0095611 | A1 | 4/2008 | Storage et al. | |
| 2011/0262695 | A1 | 10/2011 | Lee et al. | |
| 2013/0236299 | A1 | 9/2013 | Kington | |
| 2014/0030074 | A1 | 1/2014 | Roberge | |
| 2014/0284038 | A1 * | 9/2014 | Vedula | B22F 3/1055 165/185 |

FOREIGN PATENT DOCUMENTS

| | | |
|---|---|---|
| JP | 61018394 | 2/1986 |
| JP | 2006336902 | 12/2006 |
| JP | 2008144752 | 6/2008 |
| JP | 2014020588 | 2/2014 |
| JP | 2014034975 | 2/2014 |
| JP | 2014111930 | 6/2014 |
| WO | 2013163398 A1 | 10/2013 |

OTHER PUBLICATIONS

JP Office Action; Application No. 2015-206914, dated Sep. 6, 2016; 11 pages.
Japanese Office Action, Japanese Application No. 2015-206914, dated Feb. 21, 2017; Translations 6 pages, Office Action 5 pages.

* cited by examiner

HEAT EXCHANGER ASSEMBLY

CROSS REFERENCE TO RELATED APPLICATIONS

The present application is related to, and claims the priority benefit of, U.S. Provisional Patent Application Ser. No. 62/066,563 filed Oct. 21, 2014, the contents of which are hereby incorporated in their entirety into the present disclosure.

TECHNICAL FIELD OF THE DISCLOSED EMBODIMENTS

The present disclosure is generally related to gas turbine engines, in particular to heat exchanger assemblies used within gas turbine engines.

BACKGROUND OF THE DISCLOSED EMBODIMENTS

Gas turbine engines typically include an inlet, a fan, low and high pressure compressors, a combustor, and at least one turbine. The compressors compress air which is channeled to the combustor where it is mixed with fuel. The mixture is then ignited for generating hot combustion gases. The combustion gases are channeled to the turbine(s) which extracts energy from the combustion gases for powering the compressor(s), as well as producing useful work to propel an aircraft in flight or to power a load, such as an electrical generator.

During engine operation, significant heat is produced which raises the temperature of engine systems to unacceptable levels. These engine systems must be cooled to improve their life and reliability. One example is the lubrication system that is utilized to facilitate lubricating components within the gas turbine engine. The lubrication system is configured to channel lubrication fluid to various bearing assemblies within the gas turbine engine. During operation, heat is transmitted to the lubrication fluid from two sources: from heat generated by sliding and rolling friction by components like bearings and seals within a sump and from heat-conduction through the sump wall due to hot air surrounding the sump enclosure.

Generally, heat exchangers are square or cube shaped; however, many of the installation spaces are annular with curved surfaces due to the shape of the turbomachinery components and associated nacelle. Due to new engine designs, there is reduced space available for the heat exchanger, and many of these spaces are shared with multiple components.

There is therefore a need for an improved manufacturing process for heat exchanger assemblies that may be integrated into reduced spaces without influencing the ideal aerodynamic design.

SUMMARY OF THE DISCLOSED EMBODIMENTS

In one aspect, a heat exchanger assembly is provided. The heat exchanger assembly includes a frame including a non-planar outer wall, a non-planar inner wall spaced radially inward (with reference to the engine axis of rotation A) from the non-planar outer wall to form a frame cavity therebetween. The frame further includes an inlet side, including an inlet passage extending therethrough. The inlet side extends between the non-planar outer wall and the non-planar inner wall. The frame further includes an outlet side, including an outlet passage extending therethrough. The outlet side extends between the non-planar outer wall and the non-planar inner wall opposite the inlet side.

The heat exchanger assembly further includes a continuous non-planar core disposed within the frame cavity. In one embodiment, the frame and the continuous non-planar core are formed using an additive manufacturing technique.

In one embodiment, the continuous non-planar core includes at least one non-planar channel, wherein the non-planar channel is in flow communication with the inlet passage and the outlet passage. The continuous non-planar core further includes a plurality of cooling fins operably coupled to the at least one non-planar channel.

In one embodiment, the heat exchanger assembly further includes a first diffuser, including a first diffuser cavity, disposed within the frame cavity, wherein the first diffuser is in flow communication with the continuous non-planar core. In one embodiment, at least one vane is disposed within the first diffuser cavity. In one embodiment, the first diffuser and at least one vane are formed using an additive manufacturing technique.

In one embodiment, the heat exchanger assembly further includes a second diffuser, including a second diffuser cavity, disposed within the frame cavity, wherein the second diffuser is in flow communication with the continuous non-planar core. In one embodiment, at least one vane is disposed within the second diffuser cavity. In one embodiment, the second diffuser and the at least one vane are formed using an additive manufacturing technique.

In one aspect, a method of manufacturing a heat exchanger assembly is provided. The method includes the step of generating a model of the heat exchanger assembly.

The method further includes the step of performing an additive manufacturing process to form the heat exchanger assembly, wherein the heat exchanger assembly includes a non-planar outer wall, a non-planar inner wall spaced radially inward from the non-planar outer wall to form a frame cavity therebetween, and a continuous non-planar core disposed within the frame cavity. In one embodiment, performing the additive manufacturing process includes converting the model to a plurality of slices that each define a cross-sectional layer of the heat exchanger assembly.

In one embodiment, the method further includes forming an inlet side extending between the non-planar outer wall and the non-planar inner wall, and an outlet side extending between the non-planar outer wall and the non-planar inner wall opposite the inlet side, wherein an inlet passage extends through the inlet side, and an outlet passage extends through the outlet side, and wherein the continuous non-planar core is in flow communication with the inlet passage and the outlet passage.

In one embodiment, the method further includes forming at least one non-planar channel, within the continuous non-planar core, wherein the at least one non-planar channel is in flow communication with the inlet passage and the outlet passage, and a plurality of cooling fins operably coupled to the at least one non-planar channel. In one embodiment, the method further includes forming at least one diffuser, including a diffuser cavity, disposed within the frame cavity, wherein the at least one diffuser is in flow communication with the continuous non-planar core. In one embodiment, the method further includes forming at least one first vane disposed within the diffuser cavity.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

Figure 1:
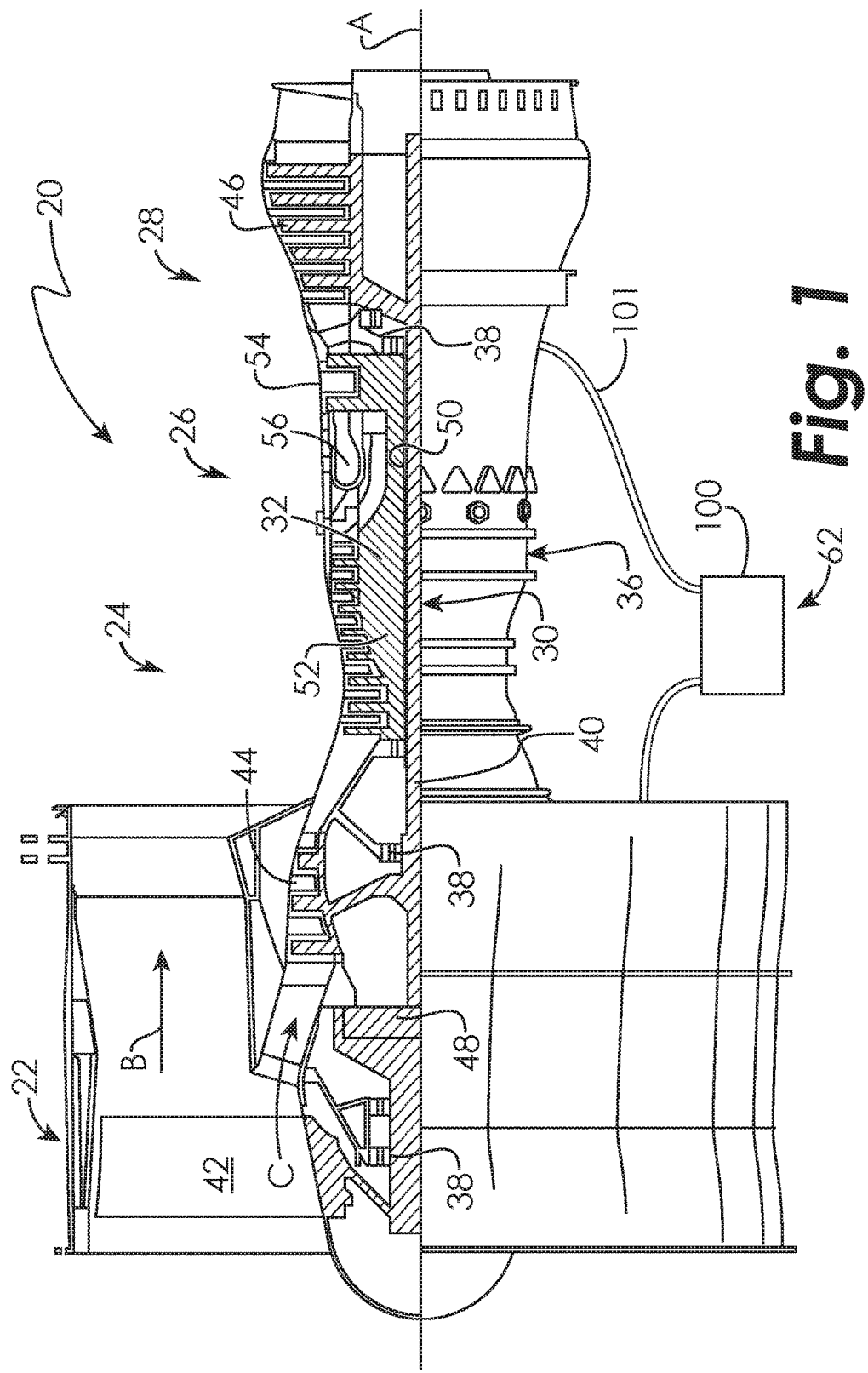
FIG. 1 is a sectional view of one example of a gas turbine engine in which the presently disclosed embodiments may be used.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 shows a gas turbine engine 20, such as a gas turbine used for power generation or propulsion, circumferentially disposed about an engine centerline, or axial centerline axis A. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft. (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram °R)/(518.7°R)]^{0.5}$. The "Low corrected fan tip speed" as disclosed herein according to one non-limiting embodiment is less than about 1150 ft/second (350.5 m/sec).

Gas turbine engine 20 further includes a nacelle, which has been opened and removed from FIG. 1 for clarity. The nacelle circumscribes the gas turbine engine 20 to create a fan bypass duct (not shown) between the nacelle and the gas turbine engine 20.

Gas turbine engine 20 can further include a lubrication system 62 for supplying lubricating oil to cool and lubricate various components of gas turbine engine 20, such as bearing systems 38 and geared architecture 48. Lubrication system 62 includes heat exchanger 100 and pipes 101. Heat exchanger 100 may be positioned at a bottom of gas turbine engine 20. It will be appreciated that the heat exchanger 100 may be positioned at any suitable location of the gas turbine engine 20. Heat exchanger 100 may be an air-oil heat exchanger for cooling the lubricating oil in lubrication system 62 via air from bypass flow path B.

Figure 2:
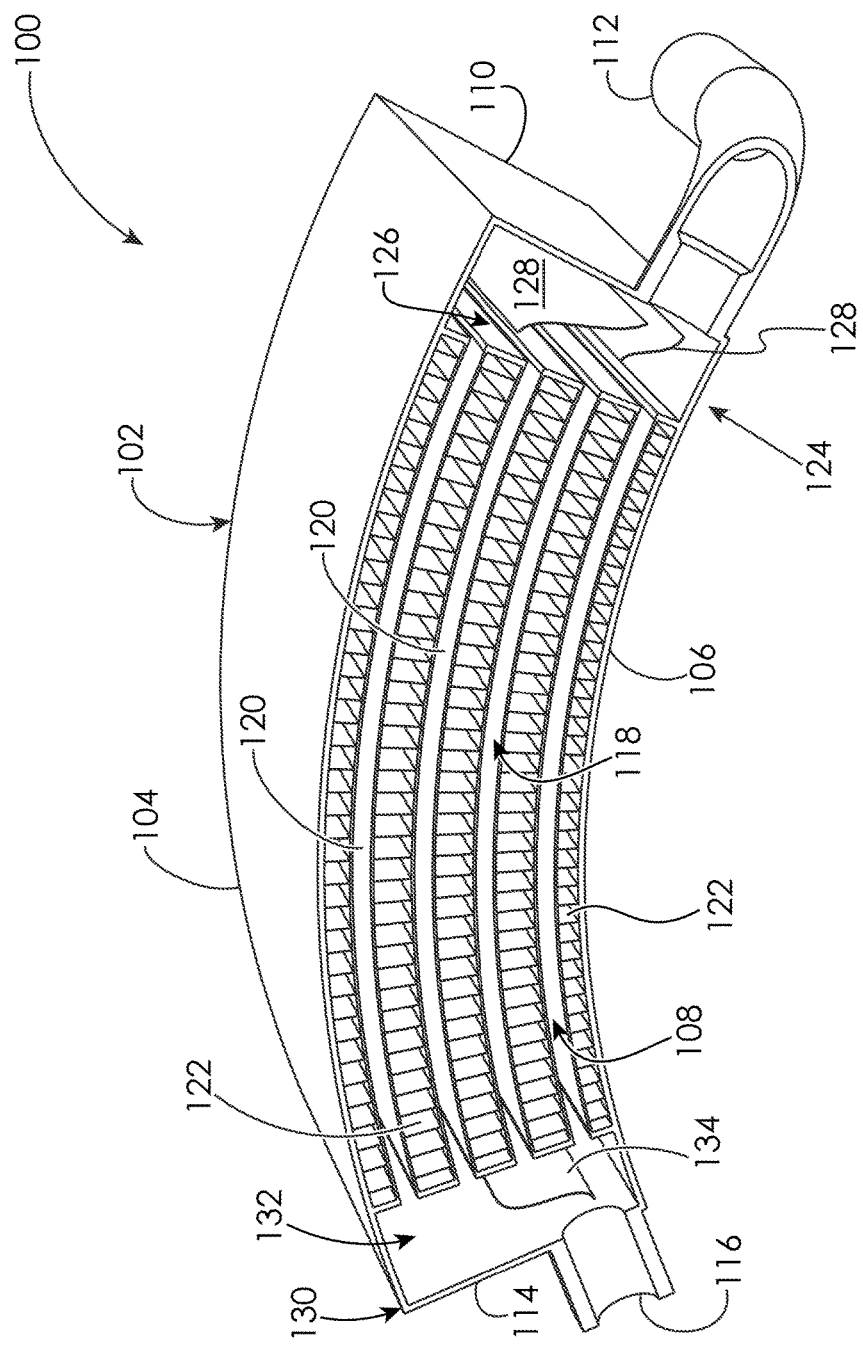
FIG. 2 is a schematic perspective, cross-sectional view of a heat exchanger assembly in one embodiment.

FIG. 2 illustrates an embodiment of a heat exchanger assembly 100 used within engine 20. Construction of a heat exchanger assembly 100 may raise difficult fabrication issues. The heat exchanger assembly 100 is a conformal air-cooled heat exchanger assembly. The heat exchanger assembly 100 is manufactured with a manufacturing processes such as additive manufacturing, for example, Direct Metal Laser Sintering (DMLS), Laser Net Shape Manufacturing (LNSM), Electron Beam Melting (EBM) to name a few non-limiting examples. Additive manufacturing refers to a category of manufacturing methods characterized by the fact that the finished part is created by layer-wise construction of a plurality of thin sheets of material. With additive manufacturing, the fabrication machine reads in the model data and then lays down successive layers of liquid, powder or related material such that it builds up the object from a series of cross sections. The properties of the materials of the individual layers are such that they are joined or fused to create the final shape. One of the many advantages to additive manufacturing is its ability to create almost any shape or geometric feature. This approach can make complex components from expensive materials for a reduced cost and with improved manufacturing efficiency. Use of additive manufacturing processes facilitates manufacture of the relatively complex geometry of the heat exchanger assembly 100 to minimize assembly details and multi-component construction.

Optionally, heat exchanger assembly 100 may be utilized in a wide variety of applications on or off the engine. For example, it may cool a fluid used to extract heat from generators or actuators used on the engine. It may also be used to cool fluids which extract heat from electronic apparatus such as engine controls. In addition to cooling a wide variety of fluids utilized by a gas turbine engine assembly, heat exchanger assembly 100 may also cool an apparatus that is mounted on the airframe, and not part of the engine. In other applications, the heat exchanger assembly 100 may be mounted remotely from the gas turbine engine, for example on an external surface of the aircraft. Moreover, heat exchanger assembly 100 may be utilized in a wide variety of other applications to either cool or heat various fluids channeled therethrough.

The heat exchanger assembly 100 includes a frame 102 including a non-planar outer wall 104, a non-planar inner wall 106 spaced radially inward (with reference to the engine axis of rotation A) from the non-planar outer wall 104 to form a frame cavity 108 therebetween. The frame 102 further includes an inlet side 110, including an inlet passage 112 extending therethrough. The inlet side 110 extends between the non-planar outer wall 104 and the non-planar inner wall 106. The inlet passage 112 is configured to allow a fluid to enter the heat exchanger assembly 100. The frame 102 further includes an outlet side 114, including an outlet passage 116 extending therethrough. The outlet side 114 extends between the non-planar outer wall 104 and the non-planar inner wall 106 opposite the inlet side 110. The outlet side 114 is configured to allow the fluid to exit the heat exchanger assembly 100. The heat exchanger assembly 100 further includes a continuous non-planar core 118 disposed within the frame cavity 108. In one embodiment, the frame 102 and the continuous non-planar core 118 are formed using an additive manufacturing technique.

In one embodiment, the continuous non-planar core 118 includes at least one non-planar channel 120, wherein the non-planar channel 120 is in flow communication with the inlet passage 112 and the outlet passage 116. The continuous non-planar core 118 further includes a plurality of cooling fins 122 operably coupled to the at least one non-planar channel 120.

In one embodiment, the heat exchanger assembly 100 further includes a first diffuser 124, including a first diffuser cavity 126, disposed within the frame cavity 108, wherein the first diffuser 124 is in flow communication with the continuous non-planar core 118. The first diffuser 124 is configured to control the characteristics of the fluid at the entrance to the continuous non-planar core 118. In one embodiment, at least one vane 128 is disposed within the first diffuser cavity 126. For example, the first diffuser 124 may be used to slow the fluid's velocity or to direct the flow in one particular direction, to name a couple of non-limiting examples. In one embodiment, the first diffuser 124 and at least one vane 128 are formed using an additive manufacturing technique.

In one embodiment, the heat exchanger assembly 100 further includes a second diffuser 130, including a second diffuser cavity 132, disposed within the frame cavity 108, wherein the second diffuser 130 is in flow communication with the continuous non-planar core 118. The second diffuser 130 is configured to control the characteristics of the fluid at the exit of the continuous non-planar core 118. In one embodiment, at least one vane 134 is disposed within the second diffuser cavity 132. For example, the second diffuser 130 may be used to increase the fluid's velocity or to direct the flow, via the at least one vane 134, in one particular direction, to name a couple of non-limiting examples. In one embodiment, the second diffuser 130 and the at least one vane 134 are formed using an additive manufacturing technique.

Figure 3:
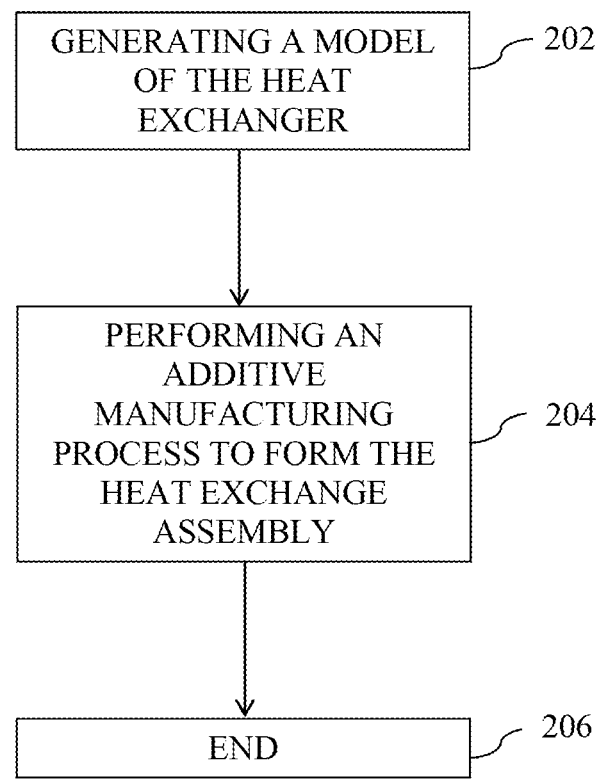
FIG. 3 is a schematic flow diagram of an embodiment of a method of manufacturing a heat exchanger assembly.

FIG. 3 illustrates a method, generally indicated at 200, of manufacturing a heat exchanger assembly 100, such as the one shown in FIG. 2. The method includes the step 202 of generating a model of the heat exchanger assembly 100. It will be appreciated that the model may be defined in any suitable manner. For example, the model may be designed with computer aided design and/or computational fluid dynamics software and may include three-dimensional numeric coordinates of the entire configuration of the heat exchanger assembly 100, including both external and internal surfaces.

The method includes the step 204 of performing an additive manufacturing process to form the heat exchanger assembly 100, wherein the heat exchanger assembly 100 includes a non-planar outer wall, a non-planar inner wall spaced radially inward from the non-planar outer wall to form a frame cavity therebetween, and a continuous non-planar core disposed within the frame cavity. For example, the heat exchanger assembly may be formed using Direct Metal Laser Sintering (DMLS). DMLS is a manufacturing process that fabricates components using three-dimensional information, for example a three-dimensional computer model. The three-dimensional information is converted into a plurality of slices, each slice defining a cross section of the component for a predetermined height of the slice. The additive manufactured heat exchanger assembly 100 is then "grown" slice by slice, or layer by layer, until completed. It will be appreciated that each layer may include a size between approximately 0.0005-0.001 inches (approximately 0.0127-0.0254 mm) in an embodiment. In one embodiment, performing the additive manufacturing process includes converting the model to a plurality of slices that each define a cross-sectional layer of the heat exchanger assembly 100. Due to the non-planar nature of the components of the heat exchanger assembly 100, each slice that intersects a non-planar component will be disposed on or within a non-planar component at some locations and will not intersect the non-planar component at other locations.

In one embodiment, step 204 further includes forming an inlet side extending between the non-planar outer wall and the non-planar inner wall, and an outlet side extending between the non-planar outer wall and the non-planar inner wall opposite the inlet side, wherein an inlet passage extends through the inlet side, and an outlet passage extends through the outlet side, and wherein the continuous non-planar core is in flow communication with the inlet passage and the outlet passage.

In one embodiment, step 204 further includes forming at least one non-planar channel, within the continuous non-planar core, wherein the at least one non-planar channel is in flow communication with the inlet passage and the outlet passage, and a plurality of cooling fins operably coupled to the at least one non-planar channel. In one embodiment, step 204 further includes forming at least one diffuser, including a diffuser cavity, disposed within the frame cavity, wherein the at least one diffuser is in flow communication with the continuous non-planar core. In one embodiment, step 204 further includes forming at least one first vane disposed within the diffuser cavity.

It will be appreciated that the heat exchanger assembly 100 includes a continuous non-planar core 118 disposed within the frame 102 to occupy less space within the engine 20, and to provide adequate levels of heat exchange within an annular cavity. It will also be appreciated that the heat exchanger assembly 100 is formed using additive manufacturing techniques to allow the heat exchanger assembly 100 to conform to the available space within the engine 20 without influencing the placement of other components or available volumes.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A heat exchanger assembly for a gas turbine engine comprising:
a frame comprising:
a non-planar outer wall;
a non-planar inner wall spaced radially inward from the non-planar outer wall to form a frame cavity therebetween;
an inlet side extending between the non-planar outer wall and the non-planar inner wall;
an inlet passage extending through the inlet side;
an outlet side extending between the non-planar outer wall and the non-planar inner wall opposite the inlet side;
an outlet passage extending through the outlet side;
the non-planar outer wall, the non-planar inner wall, the inlet side, and the outlet side defining a frame cavity therebetween;
a continuous non-planar core disposed within the frame cavity and in flow communication with the inlet passage and the outlet passage;
a first diffuser, including a first diffuser cavity, disposed within the frame cavity, wherein the first diffuser is in flow communication with the continuous non-planer core; and
at least one first vane disposed within the first diffuser cavity.

2. The heat exchanger assembly of claim 1, wherein the continuous non-planar core comprises: at least one non-planar channel, wherein the at least one non-planar channel is in flow communication with the inlet passage and the outlet passage;
and a plurality of cooling fins operably coupled to the at least one non-planar channel.

3. The heat exchanger of claim 1, further comprising a second diffuser, including a second diffuser cavity, disposed within the frame cavity, wherein the second diffuser is in flow communication with the continuous non-planar core.

4. The heat exchanger of claim 3, further comprising at least one second vane disposed within the second diffuser cavity.

5. The heat exchanger of claim 1, wherein the frame and the continuous non-planar core are formed using an additive manufacturing technique.

6. A gas turbine engine assembly comprising:
a core gas turbine engine;
a nacelle circumscribing the core gas turbine engine to create a fan bypass duct; and a heat exchanger assembly disposed within the fan bypass duct, wherein the heat exchanger assembly comprises:
a frame comprising:
a non-planar outer wall;
a non-planar inner wall spaced radially inward from the non-planar outer wall to form a frame cavity therebetween;
an inlet side extending between the non-planar outer wall and the continuous non-planar inner wall;
an inlet passage extending through the inlet side;
an outlet side extending between the non-planar outer wall and the non-planar inner wall opposite the inlet side;
an outlet passage extending through the outlet side;
the non-planar outer wall, the non-planar inner wall, the inlet side, and the outlet side defining a frame cavity therebetween;
a continuous non-planar core disposed within the frame cavity and in flow communication with the inlet passage and the outlet passage;
a first diffuser, including a first diffuser cavity, disposed within the frame cavity, wherein the first diffuser is in flow communication with the continuous non-planer core; and
at least one first vane disposed within the first diffuser cavity.

7. The gas turbine engine assembly of claim 6, wherein the continuous non-planar core comprises:
    at least one non-planar channel, wherein the at least one non-planar channel is in flow communication with the inlet passage and the outlet passage;
    and a plurality of cooling fins operably coupled to the at least one non-planar channel.

8. The gas turbine engine assembly of claim 6, further comprising a second diffuser, including a second diffuser cavity, disposed within the frame cavity, wherein the second diffuser is in flow communication with the continuous non-planar core.

9. The gas turbine engine assembly of claim 8, wherein at least one second vane is disposed within the second diffuser cavity.

10. The gas turbine engine assembly claim 6, wherein the frame, and continuous non-planar core are formed using an additive manufacturing technique.

11. A method of manufacturing a heat exchanger assembly comprising: performing an additive manufacturing process to form a non-planar outer wall, a non-planar inner wall spaced radially inward from the non-planar outer wall to form a frame cavity there between, and a continuous non-planar core disposed within the frame cavity; and
    forming a first diffuser, including a first diffuser cavity, within the frame cavity, wherein the first diffuser is in flow communication with the continuous non-planar core and at least one first vane within the first diffuser cavity.

12. The method of claim 11 further comprising:
    performing an additive manufacturing process to form an inlet side extending between the non-planar outer wall and the non-planar inner wall, and an outlet side extending between the non-planar outer wall and the non-planar inner wall opposite the inlet side;
    wherein an inlet passage extends through the inlet side, and an outlet passage extends through the outlet side; and
    wherein the continuous non-planar core is in flow communication with the inlet passage and the outlet passage.

13. The method of claim 12 further comprising: performing an additive manufacturing process to form at least one non-planar channel, within the continuous non-planar core, wherein the at least one non-planar channel is in flow communication with the inlet passage and the outlet passage, and a plurality of cooling fins operably coupled to the at least one non-planar channel.

14. The method of claim 13 further comprising:
    performing an additive manufacturing process to form the first diffuser.

15. The method of claim 11, wherein the step of performing comprises: defining a three-dimensional model of the heat exchanger assembly; and
    converting the three-dimensional model to a plurality of slices that each define a cross-sectional layer of the heat exchanger assembly.

* * * * *